United States Patent [19]

Courvoisier et al.

[11] 4,053,368
[45] Oct. 11, 1977

[54] PROCESS FOR THE PURIFICATION OF WATER

[75] Inventors: Jean-Claude F. Courvoisier; Jean-Luc Ch. Meylan, both of Geneva; Daniel M. Gross, Carouge, all of Switzerland; Jacques Pierre D. Fournier, Sciez, France

[73] Assignee: Battelle Memorial Institute, Switzerland

[21] Appl. No.: 688,834

[22] Filed: May 21, 1976

Related U.S. Application Data

[63] Continuation of Ser. No. 520,941, Nov. 4, 1974, abandoned.

[30] Foreign Application Priority Data

Nov. 7, 1973 Switzerland .................. 15642/73

[51] Int. Cl.² .................. B01D 3/00; B01D 3/10
[52] U.S. Cl. .................. 203/10; 202/233; 202/234; 202/235; 203/DIG. 1; 203/DIG. 17
[58] Field of Search .................. 203/10, 89, DIG. 1, 203/DIG. 17; 202/234, 236, 235, 233

[56] References Cited

U.S. PATENT DOCUMENTS

| | | |
|---|---|---|
| 2,141,330 | 12/1938 | Abbot .................. 202/234 |
| 3,072,920 | 1/1963 | Yellott .................. 203/DIG. 1 |
| 3,138,546 | 6/1964 | Muller .................. 202/234 |
| 3,300,393 | 1/1967 | Fisher .................. 202/234 |
| 3,359,183 | 12/1967 | Kenk .................. 202/234 |
| 3,394,054 | 7/1968 | Hoham .................. 202/234 |
| 3,455,790 | 7/1969 | Marks .................. 203/DIG. 1 |

*Primary Examiner*—Frank W. Lutter
*Assistant Examiner*—Frank Sever
*Attorney, Agent, or Firm*—Robert E. Burns; Emmanuel J. Lobato; Bruce L. Adams

[57] ABSTRACT

A process for the purification of water comprises a step-wise procedure for heating and evaporating water to be purified at different location and then condensing water thus evaporated. The water is heated in the form of a sheet by solar energy while in a pan at least part of the bottom of which is capable of absorbing the heat content of solar radiation, and in which it is covered by a layer of liquid which transmits solar radiation therethrough, is immiscible with water and which has a vapor pressure less than that of water. The liquid is usually an oil. Various mechanical devices are disclosed for optimizing utilization of solar radiation reaching the pan. Evaporation of heated water removed from the sheet of water to the evaporator is preferably effected under reduced pressure.

3 Claims, 4 Drawing Figures

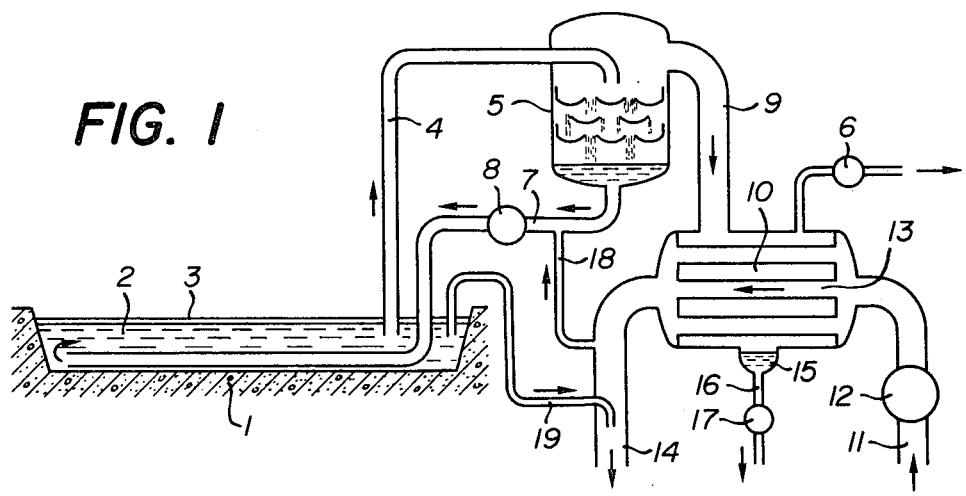
FIG. 1
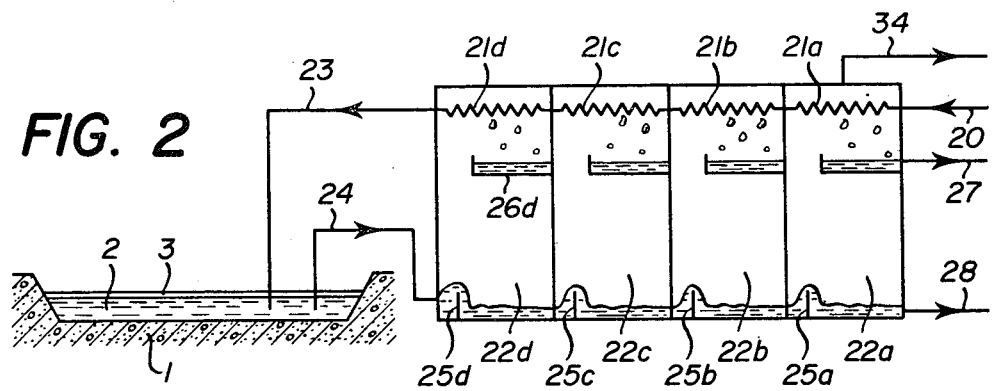
FIG. 2
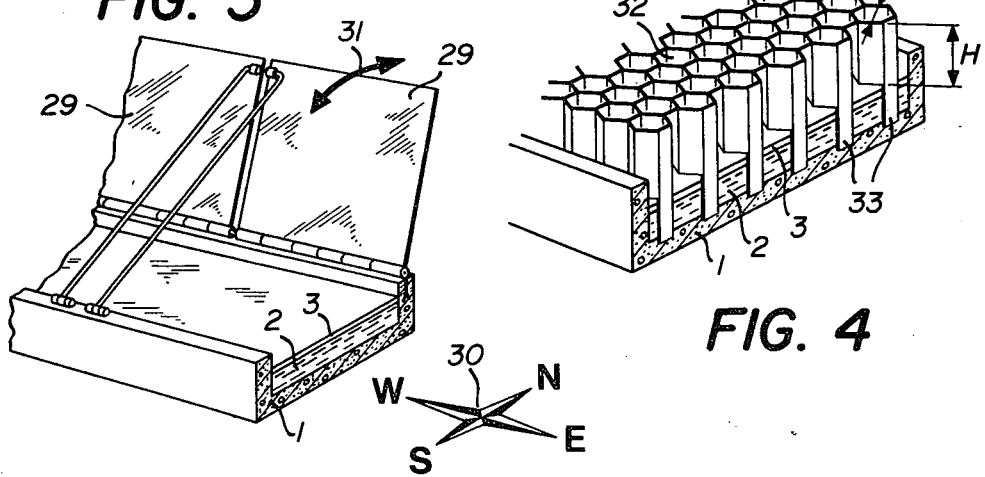
FIG. 3
FIG. 4

PROCESS FOR THE PURIFICATION OF WATER

This is a continuation, of application Ser. No. 520,941, filed Nov. 4, 1974, now abandoned.

BACKGROUND OF THE INVENTION

This invention relates to a process for the purification of water by distillation using directly solar energy.

The desalination of sea water by means of apparatus using solar energy has been practiced for a long time. Nevertheless the importance of the capital investment and of the relative cost of treatment with various known distillation apparatuses which use solar energy renders prohibitive the manufacturing cost of the water by means of these forms of apparatus and prohibits the general employment thereof.

All the apparatuses hitherto used include the application of the physical phenomenon known under the name of "conservatory effect", this phenomenon, when it occurs, is profitably utilised to warm the water and cause its evaporation under the action of solar radiation passing through a transparent cover made of plastic material or of glass. Because of the existence of a temperature difference between the interior and the exterior of the conservatory, some of the water vapour condenses on the cover and it remains to capture further desalinated water thus formed.

Experience has shown that the apparatuses of the type which have just been mentioned are inherently expensive and, moreover, that their constructional cost is directly proportional to the surface area provided and consequently to the quantity of the water to be obtained. Some apparatuses incorporate the construction of a pan entirely covered by a transparent roof which plays the part of a condensation unit, a sealing unit for the pan and a reservoir for appropriate removal. The construction of the transparent roof and the obtaining of the sealing of the fixing of the roof on the pan constitute two expensive features of the arrangement for which it is necessary to adapt the measures to be taken to cater satisfactorily for the requirements of the resistance to corrosion and the chemical inertness to solar radiation of the constituent parts of these apparatuses in order to ensure a mechanical stability enabling them to withstand strong winds.

SUMMARY OF THE INVENTION

The present invention has the object of providing for the purification of water by distillation, notably for the desalination of sea water or for obtaining drinkable water from polluted water, reducing to a large extent the cost of this operation in relation to the practice of hitherto known processes.

In this connection, the process of the invention is characterised by the fact that the water to be treated is held in the form of a sheet on a surface having the property of absorbing solar radiation by accumulating external energy, that this sheet of water is covered by a layer of liquid material, permeable to solar radiation, immiscible with water and having a vapour pressure less than that of water, that the assembly thus formed is submitted to irradiation by solar rays so as to increase the temperature of the water, that at least a part of the water thus heated is removed, that a part of the water thus removed is evaporated and that at least a part of the water vapour thus formed is recovered in the liquid state.

The components assuring the heating function by means of solar energy are thus separated from those which effect the distillation operation. This separation renders possible the utilisation of a very economical form of pan in which is effected the heating by irradiation by solar rays, this pan being, in addition, in a form which not only requires reduced upkeep and which is hardly sensitive to the influence of meteorological factors such as the wind, the sand, dust, etc. In addition, the separation of the functions of solar heating and of distillation enabling the use of a refrigerant other than atmospheric air to cause the condensation of the water vapour, permits the surface of each condensation unit to be reduced considerably and the yield to be improved to a large extent and, besides, to lower the total manufacturing cost of a treatment unit having a given production capacity.

The object of the invention is attained by effecting the heating of the water by solar energy by treatment in a zone having a large surface area while avoiding undesirable simultaneous cooling by evaporation, and by effecting the later evaporation of the water thus heated in a zone of small extent distinct from the first zone, where the collection of the distillate is easy to obtain.

As liquid material which is permeable to solar radiation, immiscible with water and having a vapour pressure less than that of water, there is preferably used an oil which is transparent or translucent at the heating temperature of the water sheet, for example, a mineral, vegetable or animal oil having a high molecular weight and an appropriate melting point. Preferably this oil is colourless or at the most weakly coloured. This material is chosen from among those which have a density less than that of water, which are not subject to the photochemical action of solar radiation and which are chemically stable to air and to contact by the water to be purified, for example sea water.

It is advantageous that this liquid material should have a high viscosity, a melting point at least equal to 0° C and a refractive index about that of water (that is about 1.33).

It is equally advantageous that this material should be opaque to infrared thermal radiations, that is to electromagnetic rays having a wavelength greater than 5 microns, whereby all loss of heat of the water layer by emission of infrared heat rays will be avoided.

For example, there can be utilised as liquid material permeable to solar radiation, a paraffin oil having at 20° C a density of 0.904 and a viscosity of 33° E (degrees Engler) (product commercially known under the trade mark Nassa Oil 79, and made by the Shell Company) as well as a paraffin oil having at 20° C a density of 0.905 and a viscosity of 75° E (the product commercially known under the trade mark Nassa Oil89 and made by the Shell Company) or even a paraffin oil having at 20° C a density of 0.892 and a viscosity of 15° E (the commercially available product known under the trade mark Vitrex Oil 71), or a paraffin oil having a density of 0.88 at 20° C.

There can equally be used mixtures of oils and of oxidation inhibitors and/or inhibitors of reaction with the salts dissolved in water, of antifoaming agents and of substances which lower the solidification temperature of the oils.

Preferably, the thickness of the layer of liquid material immiscible with water lies between 0.1 and 3 cm.

The thickness of the sheet of water is preferably at most equal to 20 cm, thereby permitting a rapid heating up of the water. The optimal value of this thickness depends on the insolation conditions and on the desired operating arrangement. In practice, this value is between 1 and 10 cm, more particularly between 2 and 6 cm. It is to be noted that, for a thickness of the water sheet less than 20 centimeters, the temperature of the sheet of water is subject to important fluctuations in the course of the day, the amplitude of these fluctuations depending on the season and the climatic conditions.

In the case where it is not desired to obtain a rapid heating up of the sheet of water but rather to limit the amplitude of the fluctuations of the temperature, one can adjust the thickness of the sheet of water to a value greater than 20 cm. As the surface having the property of absorbing solar radiation in the accumulation of solar energy, there is preferably used a flat-bottomed shallow pan at least the surface of the bottom of which has a dark colour. The absorption of solar radiation by this surface enables at least a major part of the water to be heated at the bottom of the sheet at the time of irradiation thereof.

In order to increase the effect of heating the water one can disperse therein colorants or particles of dark-coloured inert material, like carbon, having the property of absorbing the solar radiation by accumulating thermal energy which is then transmitted to the water.

In order to reduce the heat exchange by convection of air between the layer of material immiscible with water covering the surface of the sheets, and the atmosphere, at least one screen permitting the transmission of at least part of the heat energy of the solar radiation can be disposed above at least a part of this layer of material, in order to isolate a layer of air between this screen and the layer of material. One can alternatively float on a part of the surface of the sheet a plurality of hollow bodies, for example of spheroidal form, made of a material such as glass permitting the transmission of at last a part of the solar radiation.

In order to reduce the risk of detachment by the wind of the surface layer of liquid material immiscible with water which covers the sheet of water, this layer can be divided up by means of a network of wall members immersed in this sheet. Preferably, this network is covered at at least one wall means by a material which permits the transmission of at least a part of the solar radiation. One can alternatively effect this division by means of frame members floating on the water. One can, in order to increase the intensity of the irradiation received by the sheet under given conditions, use at least one reflector, for example a flat or concave reflecting surface or a plurality of such surfaces arranged in such a manner as to reflect the solar radiation on the surface of the sheet.

Advantageously, there is used at least one adjustable reflector whose reflecting surface is preferably turned towards the south, in order to be able to control the reflection angle of the radiation in the best possible manner in accordance with the angle of incidence of the solar rays.

In order to lessen thermal losses by convection with the atmosphere as well as the thermal losses by emission of infrared thermal radiation from the surface of the layer of material immiscible with water, one can use an arrangement, of a type known per se, comprising a plurality of wall members which are reflective or transparent with respect to solar radiation and which absorb infrared thermal radiation, disposed in such a way as to form a honeycomb structure, this arrangement being placed on the bottom of the pan or floating or suspended in the sheet in such an orientation that at least a part of the infrared thermal radiation omitted by the surface of the said layer undergoes a series of thermal absorptions on these walls.

In order to remove the water to be evaporated from the heated sheet, one can proceed in any appropriate manner, for example by gravity, by pumping or by thermal siphoning, this last method being that which is preferably used.

In order to evaporate the water removed from the heated sheet, one can use any appropriate known apparatus, notably an evaporator of simple or multiple effect type and containing a single stage or a plurality of stages.

Preferably the evaporation is effected under a pressure lower than atmospheric pressure.

To condense and recover the water vapour, one can use any appropriate known apparatus, in particular an apparatus comprising one or several heat exchangers, by employing as coolant any suitable fluid. Preferably there is used as coolant water which itself is to be purified, for example sea water, causing this water to flow through the heat exchanger, wherein it undergoes heating up, and sending the water to be purified leaving the exchanger to the sheet subject to the irradiation. One can thus recover a part of the heat energy lost by the purified water during its condensation, to heat up the water to be purified, thus permitting the yield of the process to be augmented.

To condense the water vapour, there can alternatively be used a chamber maintained under atmospheric pressure and provided with appropriate cooling means.

A further object of the invention is an apparatus for the purification of water by vaporisation permitting the putting into practice of the process which has just been described.

This apparatus is characterised by the fact that it includes:

at least one pan exposed to solar rays and disposed in such a manner that it can contain a sheet of salt and/or polluted water whose surface is at least partially covered by a layer of liquid material which permits the transmission therethrough of solar radiation, is immiscible with the water and has a vapour pressure less than that of the water, at least a part of the internal surface at the bottom of the pan having the ability to absorb the solar rays by accumulating thermal energy.

evaporation means disposed in such a manner as to permit evaporation of water heated up in the pan, without the assistance of solar heat energy in addition to that which has been accumulated by this water in the pan, means for condensing to the liquid state at least a part of the water vapour formed in the said evaporation means for recovering the distilled water thus obtained.

Preferably, the said evaporation means comprise at least one single stage evaporator and/or at least one evaporator of the multiple stage and/or multiple effect type.

Equally according to preference, the said evaporation means are disposed in such a manner as to operate under a lower pressure than atmospheric pressure.

Preferably at least a part of the interior surface of the bottom of the said pan has a dark colour.

It is advantageous, in order to reduce the losses of heat by conduction by the bottom and the lateral walls of the pan to provide them with a covering having a high thermal insulation coefficient, like concrete sponge and pumice stone. One can alternatively use for the fabrication of an insulating covering, different materials like rock wool, coco fibres, dried algae, etc. Moreover, in the case where the apparatus is installed in a place where the soil has itself a good thermal insulation coefficient, for example a dry sandy soil, it is enough to implant the pan in a hollow excavation in the soil, without a thermally insulating covering, by simply providing the bottom and the interior walls of the pan with a covering impermeable to the water.

The apparatus can comprise, in addition, at least one screen permitting the transmission of at least a part of the thermal energy of the solar radiation, this screen being disposed on top of at least a part of the layer of material covering the surface of the sheet of water, in such a manner as to isolate a still layer of air on top of at least a part of this surface.

The apparatus can equally well comprise at least a body floating on the surface of the layer of water or kept on the bottom of the pan by at least one suitable support, this body being, preferably, made of a material such as a transparent plastics material or glass, permitting the transmission of at least a part of the heat energy of the solar radiation, and being disposed in such a manner as to divide up the layer of liquid material covering the sheet of water.

In particular, the apparatus can comprise a plurality of hollow bodies, for example of spheroidal form, made of a material, like glass, permitting the transmission of at least a part of the heat energy of the solar radiation, disposed in such a way as to float on the sheet of water.

The apparatus can further comprise at least one reflector, for example an orientable reflecting surface which can be flat or concave, or a plurality of such surfaces, disposed in such a manner as to reflect the solar radiation on the surface of the sheet of water contained in the said pan.

Finally, the apparatus can comprise a plurality of wall members which are reflective or transparent with regard to solar radiation and which absorb infrared thermal radiation, the wall members being disposed in such a manner as to form a honeycomb structure when disposed on the bottom of the pan or floating or suspended in the sheet of water with such an orientation that at least a part of the infrared thermal radiation emitted by the surface of the layer of material which covers the sheet of water undergoes a series of thermal absorptions on these wall members.

It is to be noted that the setting up of the apparatus which has just been described can be effected in many different configurations. Notably, the pan for heating the water can be produced in the form of a pan floating on the sea or supported by appropriate supports whose feet stand on the bottom of the sea.

One can obtain the heating pan of a surface area of large dimensions by means of economical construction techniques. Around this pan, there can be disposed one or several distillation units, these latter being able to be, as the case may be, prefabricated in workshops in which technological problems posed by their construction are easily resolved. In addition, the distillation units can be made from materials which are not transparent, such as metals or plastic materials having a good resistance to corrosion and a high mechanical strength, being readily available.

BRIEF DESCRIPTION OF THE DRAWINGS

The attached drawing shows, schematically and by way of example, two forms of construction of apparatus according to this invention and two forms of construction of the pan for heating the water by use of solar radiation.

FIG. 1 of the drawing is a schematic sectional view of one form of construction of the apparatus.

FIG. 2 of the drawing is a schematic sectional view of a second form of construction of the apparatus.

FIG. 3 is a fragmentary perspective view in section of a first form of construction of the pan.

FIG. 4 is a perspective view in section of a second form of construction of the pan.

DESCRIPTION OF THE PREFERRED EMBODIMENTS

The installation shown in FIG. 1 comprises a pan 1 having a flat bottom, for example obtained by excavation of a hollow in the soil and having a surface area possibly of the order of 10,000 m$^2$ and a depth of the order of 30 cm.

The walls and the bottom of the pan 1 are, advantageously, constituted by one or several films of a plastic material which absorbs at least a part of the solar radiation, for example polyethylene, butyl rubber coloured by a dark colourant, etc., or even or tar-covered paper, positioned directly on the soil itself in the excavation and joined together in a sealed manner. It is advantageous that the bottom of the pan 1 and possibly its walls should be coloured black in order to increase the thermal absorption effect.

The pan 1 contains a sheet 2 of water to be purified, for example sea water. The depth of this sheet is, for example, 3 cm. The surface of the water is covered by a layer 3 of transparent or translucent oil which is colourless or weakly coloured and has a vapour pressure less than that of the water. The thickness of this layer of oil is preferably between 0.1 and 3 cm.

Under the action of solar radiation, the sheet 2 of water is heated up and the presence of the layer 3 may enable, if the insolation conditions are favourable, an increase in its temperature up to a temperature between 50° and 100° C because of the effect of the layer 3 in speeding up the evaporation of the water in the sheet 2.

A conduit 4 enables removal of a part of the water in the pan 1 and its supply to an evaporator 5 in which the pressure is maintained at a value lower than the atmospheric pressure by means of a vacuum pump 6. The evaporator 5 can be, for example, a plate evaporator or an evaporator of any other appropriate known type. A fraction of the order of 2% of the water introduced into the evaporator 5 evaporates there, this being accompanied by a lowering of the temperature of the body of water which has not been evaporated by the order of 10° C. A conduit 7 and a liquid pump 8 permit the recycling into the pan 1 of the fraction of water which has not been evaporated. The temperature of the water is, for example, about 60° C in the conduit 4 and about 50° C in the conduit 7.

A vapour conduit 9 allows the water vapour which has been generated in the evaporator 5 to be supplied to a condenser 10, the latter being for example a horizontal tube condenser.

Coolant water for example water previously in the sea and having a temperature of 30° C is supplied by a conduit 11, using a pump 12, to the tubes 13 of the condenser 10 and is largely disposed of, for example into the sea, after having been heated for example to a temperature of 40° C by a conduit 14. The water vapour being provided by the evaporator 5 condenses on the external walls of the tubes 13 and the desalinated water thus obtained is collected at the lower part of the inner chamber of the condenser 10, for example in a small basin 15 provided for this purpose and it is removed therefrom by means of a conduit 16 and a pump 17.

It is to be noted that the vacuum pump 6 permits the removal of gas (oxygen and nitrogen) which is continuously introduced in admixture with the water placed in circulation in the parts of the installation which serve the functions of evaporation and of condensation. The presence of this gas would deleteriously affect the correct functioning of the arrangement if it were not thus evacuated. The presence of the layer of oil on the surface of the sheet of water in the pan 1, which isolates the water from the atmosphere permits, in addition, the maintaining of a weak concentration of dissolved gas in the water and, in consequence, the limitation of the quantity of gas retained in the evaporator 5.

A small proportion of the water which has undergone a preheating as a result of its passage across the tubes 13 of the condenser 10 is removed in the conduit 14 by means of a supply duct 18 and is supplied to the pan 1 through the conduit 7. Furthermore, a small proportion of the water contained in the pan 1 is continuously removed by means of a conduit 19 and ejected, for example into the sea, in order to avoid too great an increase in the concentration of salt in the pan 1 resulting from the evaporation produced in the evaporator 5.

The energy necessary for the operation of the pumps of the installation is relatively small in relation to the cost of the desalinated water which can be obtained.

An installation in accordance with the above description provided with a pan 1 having a surface area of 10,000 square meters enables a daily production of 40 to 60 cubic metres of water to be easily obtained.

The different parts of this installation can be constructed from and used with readily available materials, the assembly of the installation being simple.

Although in the installation described above a single stage distillation unit is utilised it is clear that one can equally use at least one multiple stage distillation unit having a simple or multiple effect.

The apparatus shown in FIG. 2 comprises a pan 1 identical to that of FIG. 1 and likewise containing a sheet 2 of water to be purified covered by a translucent layer 3 of oil.

A conduit 20 enables there to be supplied across four heat exchangers (for example tube exchangers) in series 21a, 21b, 21c and 21d placed, respectively within and in the neighbourhood of the upper part of four evaporation chambers likewise disposed in series 22a, 22b, 22c and 22d, of water to be purified, for example sea water having a temperature of 25° C at its entry point to the exchanger 21a, to the pan 1, by way of a conduit 23 between the exchanger 21d and the pan 1.

After heating up in the pan 1, the water to be purified is supplied by a conduit 24 to the evaporation chamber 22d.

The temperature of the water to be purified is, for example, about 60° C on its entry into the chamber 22d and the total pressure in this chamber is about 0.14 kg/cm².

A vertical baffle 25d disposed opposite and in the neighbourhood of the outlet from the conduit 24 in the chamber 22 causes the agitation and the division of the water entering into this chamber, which is then subject to a partial evaporation.

The vapours thus formed condense on the walls of the exchanger 21a and the pure water thus obtained is collected in a dish 26d connected by conduits which are not shown to a conduit 27 for removal of the purified water.

The portion of the water to be purified which has not been evaporated in the chamber 22d passes into the following chamber 22c where there is a total pressure less than that of the chamber 22d. The chamber 22c is provided with a baffle 25c disposed in the same manner as the baffle 25d and playing an identical role. The same procedure of evaporation and of condensation of the water as that which has been described takes place in the chamber 22c and in the following chambers 22b and 22a, in which the values of the total pressure decrease to a total pressure of 0.057 kg/cm² in the chamber 22a.

The chambers 22b and 22a are likewise provided with baffles 25b and 25a whose disposal and whose function are the same as those of the deflector 25d.

The purified water obtained by condensation in the chambers 22c to 22a is recovered by the dishes 26c to 26a and conveyed in the conduit 27.

A duct 34 serves for the evacuation of gas which has not been condensed in the chambers 22a to 22d.

The water which has not been evaporated leaves the installation with a salt concentration higher than the initial concentration of the water to be purified, by means of a conduit 28.

When the installation which has just been described is supplied with sea water at a rate of 1000 cubic meters per day and a temperature of 25° C by the conduit 20 and is heated to 60° in the pan 1, there can easily be obtained 40 cubic meters of pure water per day.

The form of construction of the pan shown in FIG. 3 comprises a plurality of flat reflector elements 29 having a reflecting side (whose surface is, for example, covered by aluminium foil) facing towards the pan with the orientation shown by the arrows 30 which represent the direction of the four cardinal points in relation to the apparatus shown in FIG. 3. These reflector elements are fixed on the edges of the pan 1 by means of hinges and they are provided with means enabling them to be pivoted in the direction shown by the arrow 31 and enabling them to be maintained in a fixed but adjustable position in accordance with the variations of the maximum height of the sun on the horizon according to the season.

The form of construction of the pan shown in FIG. 4 comprises an assembly of reflecting walls 32 assembled in the form of a honeycomb structure on the sheet 2 and resting on the bottom of the pan 1 by means of a series of supports 33. Preferably the relationship H/D of the dimensions H and D shown in FIG. 4 is of the order of 2. This assembly of walls enables the heat losses by emission of infrared radiation by the sheet 2 of water to be reduced.

In the two forms of construction of pan shown in FIGS. 3 and 4 respectively, the depth of the sheet 2 is preferably about 3 cm and the thickness of the layer 3 of oil is preferably 2.5 cm.

We claim:

1. A process for the purification of water comprising:
   a. feeding water onto a solar heat absorbing surface so as to form a sheet of water thereon, b. feeding a liquid which has a density and vapor pressure less than said water, onto said sheet, so as to form a layer of said liquid on said sheet, which functions at least to transmit solar radiation to said water, c. preheating said water by direct solar radiation, d. further preheating said water by reflected solar radiation and forming a still air blanket over said layer with reflection and still air blanket producing means, e. conducting step (c) and (d) simultaneously, so as to produce preheated water, f. feeding said preheated water from said sheet to an evaporator means, g. evaporating at least a portion of said preheated water within said evaporator means, to form water vapor, h. feeding said water vapor to a condenser means, i. condensing water vapor so as to recover a purified water product therefrom.

2. The process of claim 1, wherein said reflection and still air blanket forming means comprises a honeycomb structure which functions to reflect solar radiation and to form said blanket of still air.

3. The process of claim 1, wherein said reflection and still air blanket forming means comprises a plurality of flat mirrors which functions to reflect solar radiation and a screen which functions to form said still air blanket.

* * * * *